United States Patent [19]

Morgan et al.

[11] 4,101,463

[45] Jul. 18, 1978

[54] MOLDED COMPOSITION AND ARTICLE MOLDED THEREFROM

[75] Inventors: Donald F. Morgan, Bloomingdale; Irwin S. Wolosky, Parsippany, both of N.J.

[73] Assignee: Amerace Corporation, New York, N.Y.

[21] Appl. No.: 804,471

[22] Filed: Jun. 7, 1977

Related U.S. Application Data

[63] Continuation of Ser. No. 546,875, Feb. 4, 1975, abandoned.

[51] Int. Cl.² .................... C08J 11/04; B29H 19/00
[52] U.S. Cl. .................... 260/2.3; 260/710; 526/20; 526/30
[58] Field of Search ............ 260/2.3, 710; 526/20, 526/30

[56] References Cited

U.S. PATENT DOCUMENTS

| | | | |
|---|---|---|---|
| 2,378,717 | 6/1945 | Macey | 260/2.3 |
| 2,966,468 | 12/1960 | Dasher | 260/2.3 |

*Primary Examiner*—John C. Bleutge
*Attorney, Agent, or Firm*—S. Michael Bender; Ken Richardson

[57] ABSTRACT

A molding composition processable into a vulcanized elastomeric article such as a solid rubber tire, for example, is formed by mixing together previously vulcanized scrap rubber, a vulcanizing agent such as sulfur, and suitable quantities of accelerator and/or activator. The mixture is then vulcanized under heat and pressure. An alternatively preferred embodiment of the instant invention comprises the addition of a small amount of virgin rubber to the composition.

25 Claims, No Drawings

MOLDED COMPOSITION AND ARTICLE MOLDED THEREFROM

This is a continuation of application Ser. No. 546,875, filed Feb. 4, 1975, now abandoned.

BACKGROUND OF THE INVENTION

The instant invention relates generally to curable molding compositions and more particularly, to a curable molding composition wherein the vulcanizate comprises primarily previously vulcanized scrap rubber.

Without limiting the present invention, the molding compositions disclosed herein are especially suitable for producing solid rubber tires. As is well known, solid rubber tires are commonly used in conjunction with a wide variety of industrial and consumer products including lawn mowers, tricycles, light duty tractors, hand carts, material handling equipment and so on. With such ultimate uses in mind, it is evident that these solid rubber tires must possess sufficient strength and wear resistant characteristics yet be relatively inexpensive to manufacture.

Prior solid rubber tires were initially manufactured using virgin rubber as the sole or primary source of vulcanizate. For purposes of this application, virgin rubber may be defined as any hydrocarbon rubber polymer which has not previously been subjected to vulcanization. Vulcanization, as is well known, essentially is the treatment of a hydrocarbon rubber polymer in such a manner as to cross-link its long chain molecules with those of a cross-linking agent thereby producing a three-dimensional structure. The result of this reaction is to transform the soft, relatively weak, plastic polymeric material into a relatively strong, elastic material resistant to deterioration normally caused by heat, light and aging process. Vulcanization may be accomplished by a variety of methods, one of the most common being sulfur vulcanization. In this process suitable quantities of sulfur and accelerator are added to the hydrocarbon rubber polymer and the resultant mixture is then subjected to pressure and heat causing the long-chain polymer molecules to cross-link with the sulfur molecules to form three-dimensional molecular structures.

Tires made exclusively from virgin rubber stock possess excellent strength, durability and wear resistant characteristics, however, due to the relatively high cost of such virgin rubber, such tires have proved, from an economic viewpoint, to be commercially prohibitive.

In an effort to produce a tire having the strength and durability of a virgin rubber tire, but at a more commercially acceptable cost, previous attempts have been made to substitute for virgin rubber other less expensive hydrocarbon rubber polymers capable of being vulcanized. One such approach is to employ a form of scrap rubber known as reclaimed rubber as the primary or even the sole source of vulcanizable hydrocarbon rubber polymer. Reclaimed rubber is previously vulcanized rubber which has had fabric and other foreign materials removed and which is then subjected to a devulcanization process. This devulcanization step may be accomplished by a variety of well-known procedures, all intended to depolymerize the rubber molecules without removing any of the combined sulfur. Devulcanization permits subsequent re-vulcanization because it effectively increases the number of unsaturated linkages in the molecular structure of the still cross-linked rubber polymers. Heretofore it had been believed that scrap rubber which did not undergo this devulcanization process was fully saturated and therefore was incapable of further cross-linking. Thus, manufacturers of solid rubber tires are able to re-vulcanize this reclaim by itself or mixed with virgin rubber, to form molded solid rubber tires. Tires made either exclusively or in part from reclaimed rubber stock generally perform satisfactorily and are lower in cost than their counterparts produced exclusively from virgin rubber.

However, reclaimed rubber especially in powdered or ground form is much softer and more flowable than vulcanized rubber which has not undergone the devulcanization step, for example, thus making processing somewhat difficult. This handling difficulty coupled with the actual cost of the additional devulcanization step has been found to increase rather than decrease the cost of manufacturing solid rubber tires, for example.

A second approach taken by various manufactures of solid rubber tires is to employ molding compositions comprising virgin rubber as the primary source of vulcanizable hydrocarbon rubber polymer with the virgin rubber being highly loaded with a relatively inexpensive filler material to reduce the cost. In this regard, conventional scrap rubber was found to serve as an ideal filler material. As used hereinafter, the term scrap rubber means a hydrocarbon rubber polymer which has previously been vulcanized but which has not been subjected to a subsequent devulcanization step, though all fabric and other foreign materials may have been removed. In the known molding process, the scrap rubber filler constituent is ground to a suitable particle size and mixed with virgin rubber, typically in a 1:1 or at most a 2:1 ratio of filler material to virgin rubber. The reason the amount of virgin rubber to the scrap rubber filler ratio is so appreciable, however, is that, heretofore, scrap rubber was believed to be incapable of being revulcanized and subsequently molded into a useful elastomeric product.

Against the foregoing background, it is the primary objective of the present invention to provide a vulcanizable molding composition wherein scrap rubber is utilized primarily as the sole source of vulcanizate.

It is another object of this invention to provide a solid rubber tire fabricated from a molding composition utilizing scrap rubber as the sole source of vulcanizable rubber.

It is an additional object of this invention to provide a solid rubber tire which exhibits physical properties equal or superior to conventional solid rubber tires and which can be manufactured at greatly reduced cost.

Still other objectives and advantages will be made apparent from a study of the following detailed explanation of the invention in connection with the sole accompanying drawing which constitutes a flow diagram diagrammatically indicating the manner in which solid rubber tires according to the present invention may be fabricated.

SUMMARY OF THE INVENTION

Toward the accomplishment of the foregoing objectives and advantages, the present invention briefly comprises a molding composition processable into an elastomeric article such as a solid rubber tire wherein the composition comprises a previously vulcanized hydrocarbon rubber polymer, a vulcanizing agent, and an accelerator, and wherein the previously vulcanized hydrocarbon rubber polymer makes up from about 92 to about 99% of the total weight of the composition. In an alternatively preferred embodiment of the invention a limited amount of virgin rubber may be added to the composition. Still further, the invention contemplates the process whereby said composition may be vulcanized to produce a useful article such as, for example, a solid rubber tire.

DESCRIPTION OF THE PREFERRED EMBODIMENTS

As mentioned above, the present invention contemplates a curable hydrocarbon rubber polymeric molding composition utilizing scrap rubber essentially as the vulcanizable component therein. The scrap rubber which is to be employed in the composition of the present invention comprises a previously vulcanized hydrocarbon rubber polymer which had been molded or formed into a usable rubber product but which, for one reason or another, has been discarded or is no longer considered useful for its original purpose. Frequently, scrap rubber takes the form of automobile or truck tire carcasses, tire buffings, inner tubes or other like structures. Generally this scrap rubber may be readily obtained in particularized or ground up form from a variety of known sources. It is important that the scrap rubber which is to be used in the present invention has had the fabric and other foreign materials removed prior to being further ground, as will be explained below, although it should not have undergone a devulcanization process.

When used to manufacture solid rubber tires, for example, it is preferable, from an aesthetic point of view, that the scrap rubber be black in color. If the scrap rubber contains any whitewall it will result in white speckles dispersed throughout the finished product. Any such color irregularities could, however, if so desired, be corrected by adding a coloring agent, such as carbon black, to the molding composition.

Chemically speaking, the type of scrap rubber or previously vulcanized hydrocarbon rubber polymer ingredient employed is a mere matter of choice since satisfactory results may be obtained using either previously vulcanized natural rubber or known synthetic rubbers, such as butadiene styrene copolymers (SBR) or butadiene acrylonitrile copolymers, or using compatible combinations of any of the foregoing.

While the invention may be practiced without grinding the scrap rubber to a finely divided form, it is preferred that the scrap rubber be ground into a powder-like substance using a conventional grinder, preferably a scissors-type grinder. One such scissors-type grinder is manufactured by Foremost Machine, Inc. and is identified as a Model 3E-1 High Shear Plastic Scrap Grinder. The degree to which the scrap rubber is ground is not critical since the particle size of the scrap rubber has only a limited effect on the physical properties of the finished solid rubber tire. However, it is noted that the aesthetic appearance of the tire is somewhat dependent upon particle size with more finely ground scrap rubber tending to form smoother, more aesthetically appealing tires. Accordingly, it has been determined that scrap rubber ground to a particle size of about 20 mesh is preferred. Slightly improved physical properties have been observed when the tire is molded from scrap rubber ground finer than 20 mesh, i.e., 35 mesh, however, to obtain stock ground this fine generally entails more elaborate and thus more expensive grinding means which correspondingly raises the cost of the resultant product.

As heretofore stated, in accordance with the invention ground scrap rubber comprises the principal source of vulcanizable rubber and, in this regard, may be employed in amounts ranging from about 92 to about 99% by weight of the total composition from which a useful article, such as a solid rubber tire, for example, may be molded. It has been found that slightly improved physical properties have resulted when the amount of scrap rubber ranges from about 96 to about 99% by weight of the total composition and, therefore, this range is preferred. Particularly good results have been achieved with compositions comprising scrap rubber ranging from about 98 to about 99% by weight of the composition and accordingly, this range is especially preferred.

In accordance with another feature of the invention, the scrap rubber is mixed with a blend of curatives and accelerators and/or activators. While any type of known vulcanizing agent may be employed including, but not limited to, metal oxide compounds, difunctional compounds such as phenolic resins, and peroxides such as dicumyl peroxide; the use of sulfur, either in its elemental form or in compound form, is preferred. Excellent results have been obtained using elemental sulfur, especially in its rhombic form.

The vulcanizing agent, e.g., elemental sulfur is preferably employed in an amount ranging from about 1 to about 4% by weight of the entire composition. Especially good results are obtained when the composition contains elemental sulfur in an amount in the range from about 1 to about 2% by weight of the total composition and, as such, this range is particularly preferred.

While vulcanization may proceed without the addition of accelerators and/or activators, the properties of the resultant molded article would be relatively poor and the molding or cure cycle too long to be commercially feasible. That is, the addition of these accelerators or activators reduces the vulcanization mold time and permits the use of lower temperatures and pressures during the molding cycle. Generally, the amount of accelerator employed in the composition may comprise as much as about 2% based upon the total weight of the composition. While most compounds chosen from the guanidine, thiazole, dithiocarbamate and thiuram families may be employed as accelerators, either alone or in combination, it has been found desirable to employ a combination or blend of at least two accelerators, one preferably comprising a thiazole accelerator and the other a thiuram sulfate accelerator. Particularly good results have been obtained using a mixture of dibenzthiazole disulfide available from DuPont under the trademark M.B.T.S. and tetramethyl thiuram monosulfide also available from DuPont under the trademark Thionex. As such, this combination of accelerators is particularly preferred.

Dibenzthiazole disulfide may be employed in an amount by weight not exceeding about 1% of the entire composition, with an amount by weight ranging from about 0.1 to about 0.5% of the entire composition being particularly preferred. Similarly, tetramethyl thiuram monosulfide may constitute from about 1% or less of the weight of the entire composition, with an amount in the range of about 0.03 to about 0.05% by weight of the entire composition being especially preferred.

In addition to the foregoing ingredients, it will be apparent to those skilled in the art that a variety of other ingredients may be employed which do not affect the essential nature of the resultant product. Indeed, many such ingredients may be provided for the purpose of improving other properties thereof or for the purpose of improving industrial acceptance. Typical ingredients include, but are not limited to, coloring agents such as carbon black, aging inhibitors, processing lubricants, and mold release agents.

Slightly improved physical properties, particularly improved tear strength, have been observed when a small amount of virgin rubber has been mixed with the ground scrap rubber ingredient and, as such, one alternatively preferred embodiment of the invention provides for the inclusion of a limited amount of virgin rubber in the composition. In this alternative embodiment, the virgin rubber may be either natural rubber of any of the commonly known synthetic rubber polymers, or may be compatible combinations of any of the foregoing. The particle size of the virgin rubber employed should be of the same size or smaller than the scrap rubber employed with which the virgin rubber is to be mixed. This will aid in mixing the two rubber compounds and will yield a more aesthetically appealing product.

Satisfactory results have been obtained utilizing a virgin rubber additive in the form of a synthetic acrylonitrile rubber copolymer made available by B. F. Goodrich under the mark HYCAR.

Virgin rubber in latex form is particularly preferred, however, because the latex form eliminates the need to first masticate the virgin rubber into powdered form prior to its mixture with the scrap rubber ingredient. While any known type of virgin rubber in latex form would be satisfactory, it has been found that particularly good results have been obtained with a latex rubber composition made available by Firestone under the designation FR-S - 2000. This particular latex composition contains about 43.5% by weight of synthetic butadiene styrene copolymer in latex form with 47.9% of the total solids of the latex composition constituting bound styrene.

In the alternatively preferred embodiment wherein virgin rubber is employed, the latter may generally be included in amounts ranging from about 1 to about 5% by weight of the composition. Due to the fact that virgin rubber is significantly more expensive than scrap rubber, it is economically desirable to employ as low a percentage of virgin rubber as possible. Therefore, compositions containing from about 1 to about 3% by weight of virgin latex ingredient are preferred. Particularly good results have been observed when the composition contains about 2.5% by weight of virgin rubber latex additive. When virgin rubber is mixed with the scrap rubber ingredient, the percentage of scrap rubber may range from about 92 to about 99% by weight of the total composition, with a range of about 95 to about 96% by weight being most preferred. The relative proportions of the accelerators and vulcanization agent in the recipe may be the same as in the embodiment initially described above where no virgin rubber is added to the scrap rubber component.

An important feature of the present invention is the manner in which the ingredients are combined to form a curable molding composition capable of fabricating a useful article such as a solid rubber tire, for example. This process is illustrated in the accompanying schematic block diagram. As mentioned previously, it is preferred that the scrap rubber, with all foreign matter removed, be ground up in a scissors-like grinder into a powder form, preferably to a particle size of about 20 mesh.

The ground scrap rubber as shown in block 10, is then weighed and dispersed by a conventional weigh/feeder device, such as a gravimetric feeder device, into a conventional mixing device, preferably a dry, ribbon-type mixer capable of generating movement among the particles so as to uniformly disperse them. The curative blend consisting of proper amounts of the vulcanizing agent and accelerators, as shown in block 12, is then weighed out and added to the ground scrap rubber contained in the ribbon-type mixer by use of a second weigh/feeder device. The ingredients are then uniformly dry blended in this ribbon-type mixer, as illustrated in block 14, and dried, as shown in block 16. Ground scrap rubber is essentially hygroscopic in nature and its residual water should be removed prior to the vulcanization and molding step. Drying may be accomplished by any conventional drying means, preferably a fluidized type drying device which permits the particles to be moved about. Most preferred is a forced air vibratory drying unit in which the particles are agitated and heated to temperatures not exceeding about 220° F for a period of time sufficient to adequately remove all residual moisture.

The dry ingredients are weighed and then introduced, in proper amounts, by a dry measuring device, preferably a gravimetric weigh/feeder, into vulcanizing molds of the size and shape necessary to produce the desired solid rubber articles such as solid rubber tires. Hydraulic or toggle type vulcanization molds are preferred. Vulcanization, as shown in block 18, may be accomplished at molding temperatures between about 310° and about 410° F, at pressures above about 1,000 pounds per square inch and for a period of time ranging from about 5 to about 20 minutes. Mold time, is however, dependent upon the size of the article to be molded and may vary substantially according to the size of the article to be produced. Particularly good results have been obtained when the molding temperature is about 350° F and when the pressure is between about 1,500 and about 4,000 pounds per square inch. At this temperature and pressure, it has been observed that relatively short molding cycles may be achieved and, as such, this temperature and pressure range are preferred.

Upon depressurization, the resultant product, as illustrated schematically in block 20, is demolded, trimmed and cooled by conventional means resulting in a solid rubber product possessing physical properties similar to products made exclusively from virgin rubber or from reclaimed rubber.

In the alternate embodiment where virgin rubber is employed, while the virgin rubber may be added at any time prior to the drying cycle, it is preferred that the virgin rubber be added prior to the addition of the curative blend. When the virgin rubber is in powder or solid form, it may be introduced employing any conventional dry measuring device, including a gravimetric weigh/feeder. When, however, a latex virgin rubber is employed, a liquid measuring device such as a metering pump should be used to introduce the virgin rubber into the ribbon-type mixing device. The addition of virgin rubber and its subsequent combination with the scrap rubber and the curative blend may take place in an oxygen-containing atmosphere.

The following examples serve to illustrate certain preferred embodiments of the present composition and process and are not limitative of scope:

EXAMPLE I

In order to illustrate the preparation of a useful elastomeric article, such as, for example a solid rubber tire, in accordance with principles of the invention, a composition was prepared employing ground scrap rubber as the sole source of vulcanizable hydrocarbon rubber polymer. This composition comprises the following ingredients with their respective amounts being specified as a percentage weight of the total weight of the composition.

| INGREDIENT | PERCENTAGE BY WEIGHT |
| --- | --- |
| Tire buffings, ground to 20 mesh | 98.02% |
| Elemental sulfur | 1.63% |
| Dibenzthiazole disulfide | 0.30% |
| Tetramethyl thiuram monosulfide | 0.05% |

The formulation was prepared by first grinding the tire buffings to a particle size of 20 mesh by use of a scissors-type grinder and introducing the particles into a ribbon-type mixer together with a curative blend of elemental sulfur, dibenzthiazole disulfide and tetramethyl thiuram monosulfide and mixing until all the ingredients were uniformly dispersed. The resultant composition was then dried in a forced air vibratory at an air temperature of 220° F and then introduced into a vulcanizing mold. The mold was pressurized to 1500 psi and heated to a temperature of 350° F. The vulcanization cycle was for a time period of 5 minutes.

The resultant solid rubber tire, after demolding and trimming had the following physical properties:

| Tensile Strength | 721 psi |
| --- | --- |
| Elongation | 176% |
| Hardness | 67 Durometer A |
| Specific Gravity | 1.13 |

Of these physical tests, the most important, from a structural integrity viewpoint were its tensile strength and elongation percentages. A tensile strength of 721 psi indicated that the previously vulcanized scrap rubber particles had more than adequately been revulcanized showing that the resultant product was well-bonded. Adequate vulcanization is generally indicated by a tensile strength above about 600 psi. The elongation percentage of 176% was substantially above the elongation percentage of at least about 150% required to stretch the tire over a wheel center without causing physical damage to the tire. The other physical properties are indicative of a commercially desirable solid rubber product. A hardness of 67 Durometer A indicated that the product was capable of absorbing the punishment which an article, such as, for example, a solid rubber tire, would be constantly subjected to and a specific gravity of 1.13 indicated that the article was constructed using a minimum amount of hydrocarbon rubber polymer.

Similar results are obtained when other types of scrap rubber are employed in a ground state. Further, when other accelerators and curative blends are substituted, articles with similar physical properties are produced. For example, when other accelerators and/or accelerator blends chosen from the guanidine, thiazole and dithiocarbamate familes are substituted for the above identified accelerators, a well vulcanized solid rubber article with good physical properties is obtained.

EXAMPLE II

In order to demonstrate the effects of practicing the instant invention with unground rubber, the procedure as set forth in Example I was repeated with the same ingredients in the same percentages, only employing ground scrap rubber as the sole source of vulcanizable hydrocarbon rubber polymer. In this example, the scrap rubber was cut into strips of varying widths and thicknesses measuring approximately one-half inch long and was not subjected to a grinding process. The formulation was prepared in accordance with Example I and the physical properties of the resultant product were as follows:

| Tensile Strength | 748 psi |
| --- | --- |
| Elongation | 143% |
| Hardness | 67 Durometer A |
| Specific Gravity | 1.131 |

It is of note that the resultant article had essentially the same physical properties as the article produced with ground scrap rubber with the exception of a noticeable difference in elongation properties where the article fabricated from rubber which had been ground was superior.

EXAMPLE III

In order to determine the effects of employing scrap rubber ground to an extremely fine powder, the procedure as set forth in Example I was repeated with the exception that the scrap rubber was ground to a particle size of 35 mesh. The resultant product had a higher tensile strength and greater elongation than the tire in Example I.

EXAMPLE IV

In order to demonstrate the preparation of a solid rubber tire of the instant invention employing a different source of scrap rubber, the same procedure as set forth in Example I was repeated with the following ingredients in the following percentages wherein scrap tires ground to a particle size of 20 mesh replaced the tire buffings as the sole source of vulcanizable rubber:

| INGREDIENTS | PERCENTAGE BY WEIGHT |
| --- | --- |
| Scrap tires ground to 20 mesh | 98.35% |
| Elemental sulfur | 1.42% |
| Dibenzthiazole disulfide | 0.19% |
| Tetramethyl thiuram monosulfide | 0.04% |

The physical properties of the resultant solid rubber article were substantially the same as the physical properties of the product in Example I with slightly improved tensile strength though less elongation. Both figures, however, were satisfactory.

EXAMPLE V

In order to illustrate the preparation of an alternate embodiment of the present invention containing a limited amount of virgin rubber mixed with scrap rubber, a solid rubber article was produced according to the procedure set forth in Example I. The mold time was, however, changed to 6 minutes.

| INGREDIENTS | PERCENTAGE BY WEIGHT |
|---|---|
| Scrap tire buffings ground to 20 mesh | 95.39% |
| Rubber latex solids (Firestone FR-S-2000) | 2.85% |
| Elemental sulfur | 1.62% |
| Dibenzthiazole disulfide | 0.30% |
| Tetramethyl thiuram monosulfide | 0.04% |

The resultant solid rubber tire had the following physical properties:

| Tensile Strength | 875 psi |
|---|---|
| Elongation | 210% |
| Hardness | 64 Durometer A |
| Specific Gravity | 1.153 |

As compared with the physical properties of the solid rubber article produced according to the process of Example I, the tensile strength and elongation properties were improved, however, the hardness and specific gravity were less desirable than the article of Example I.

EXAMPLE VI

In order to demonstrate the effects of producing an article composed of unground scrap rubber and virgin rubber, the same procedure as set forth in Example V was repeated with the same ingredients in the same percentages only substituting unground scrap rubber mixed with rubber latex as the source of vulcanizable rubber. In this example the scrap rubber was cut into strips approximately one-half inch long and was not subjected to a grinding process. The physical properties of the resultant product were as follows:

| Tensile Strength | 743 psi |
|---|---|
| Elongation | 154% |
| Hardness | 68 Durometer A |
| Specific Gravity | 1.148 |

The physical properties of the article produced according to this process were similar to those of the tire produced in Example II.

EXAMPLE VII

In order to determine the effects of producing an article composed of a combination of finely ground vulcanized, scrap rubber and virgin rubber latex, the procedure as set forth in Example V was repreated with the exception that the vulcanized scrap rubber was ground to a 35 mesh prior to its mixture with the virgin rubber latex. The resultant product had the following physical properties:

| Tensile Strength | 975 psi |
|---|---|
| Elongation | 201% |
| Hardness | 67 Durometer A |
| Specific Gravity | 1.136 |

These results compare quite favorably to the physical properties of all tires produced according to this invention.

EXAMPLE VIII

In order to demonstrate the effects of producing a solid rubber tire composed of ground scrap rubber and a nonlatex virgin rubber the same procedures as set forth in Example V were repeated with the following ingredients in the following percentages, specifically replacing rubber latex as the source of virgin rubber with a nitrile synthetic rubber powder.

| INGREDIENTS | PERCENTAGE BY WEIGHT |
|---|---|
| Scrap tires ground to 20 mesh | 97.39% |
| Virgin Rubber (Firestone 1422 nitrile powder) | 0.97% |
| Elemental sulfur | 1.41% |
| Dibenzthiazole disulfide | 0.19% |
| Tetramethyl thiuram monosulfide | 0.03% |

The resultant product had a tensile strength of 723 psi and an elongation of 158%, both completely satisfactory for use as an industrial solid rubber tire.

The foregoing examples are for illustrative purposes only and the invention is not to be limited except as set forth in the following claims.

Wherefore we claim:

1. A vulcanizing molding composition processable into a solid rubber tire, said composition consisting essentially of:
   a. a previously vulcanized non-devulcanized hydrocarbon rubber polymer in an amount ranging from about 94% to about 99% by weight of the total composition;
   b. a vulcanizing agent in an amount ranging from about 1 to about 4% by weight of the total composition; and
   c. an accelerator comprising a mixture of at least two compounds present in an amount of from about 0.13% to about 2% by weight of the total composition, said at least two compounds being selected from the group consisting of quanidines, thiazoles, dithiocarbamates and thiurams.

2. A vulcanizing molding composition processable into a solid rubber tire, said composition consisting essentially of:
   a. a previously vulcanized non-devulcanized hydrocarbon rubber polymer in an amount ranging from about 92 to about 98% by weight of the total composition;
   b. a vulcanizing agent in an amount ranging from about 1 to about 4% by weight of the total composition;
   c. an accelerator comprising a mixture of at least two compounds present in an amount of from about 0.13 to about 2% by weight of the total composition, said at least two compounds being selected from the group consisting of quanidines, thiazoles, dithiocarbamates and thiurams; and
   d. a virgin hydrocarbon rubber polymer in an amount up to about 5% by weight of the total composition.

3. The composition of claim 1 wherein said previously vulcanized hydrocarbon rubber polymer comprises scrap rubber.

4. The composition of claim 3 wherein said scrap rubber is ground to a particle size of about 20 mesh.

5. The composition of claim 1 wherein said vulcanizing agent comprises sulfur.

6. The composition of claim 5 wherein said accelerator consists of a mixture of dibenzthiazole disulfide and tetramethyl thiuram monosulfide.

7. The composition of claim 6 wherein said dibenzthiazole is present in amounts between about 0.1 and about 0.5% and tetramethyl thiuram monosulfide is present in amounts between about 0.03 and about 0.05%.

8. The composition of claim 1 wherein said composition comprises a previously vulcanized hydrocarbon rubber polymer in an amount ranging from between about 96 to about 99% by weight of the total composition.

9. The composition of claim 2 wherein said virgin hydrocarbon rubber polymer comprises between about 1 and about 5% by weight of the total composition.

10. The composition of claim 9 wherein said virgin hydrocarbon rubber polymer comprises rubber latex.

11. The composition of claim 8 wherein said previously vulcanized hydrocarbon rubber polymer comprises from about 98 to about 99% by weight of the total composition, said vulcanizing agent comprises sulfur in a range from about 1 to about 2% by weight of the total composition and said accelerator comprises a mixture of dibenzthiazole disulfide and tetramethyl thiuram monosulfide wherein said dibenzthiazole disulfide ranges from about 0.19 to about 0.3% by weight of the total composition and said tetramethyl thiuram monosulfide ranges from about 0.03 to about 0.05% by weight of the total composition.

12. The composition of claim 10 wherein said previously vulcanized hydrocarbon rubber polymer comprises from about 95 to about 96% by weight of the total composition, said accelerator comprises a mixture of dibenzthiazole disulfide and tetramethyl thiuram monosulfide, wherein said dibenzthiazole disulfide ranges from about 0.19 to about 0.3% by weight of the total composition and said tetramethyl thiuram monosulfide ranges from about 0.03 to about 0.05% by weight of the total composition and said rubber latex ranges from about 1 to about 3% by weight of the total composition.

13. A process for producing a molded vulcanized rubber composition, particularly adaptable for use as a solid rubber tire, said process comprising:
   a. combining a mixture consisting essentially of of:
      (i) from about 94 to about 99% by weight of the total composition of a previously vulcanized non-devulcanized hydrocarbon rubber polymer;
      (ii) from about 1 to about 4% by weight of the total composition of a vulcanizing agent;
      (iii) from about 0.19 to 0.03% by weight of the total composition of a dibenzthiazole disulfide accelerator and from 0.03 to about 0.05% by weight of the total composition of a tetramethyl thiuram monosulfide accelerator;
   b. dry mixing said composition in such a manner that its constituent parts become uniformly dispersed;
   c. drying said composition;
   introducing said composition into a vulcanizing mold and thereafter vulcanizing said composition.

14. A process for producing a molded vulcanized rubber composition, particularly adaptable for use as a solid rubber tire, said process consisting essentially of
   a. combining a mixture of:
      (i) from about 92 to about 99% by weight of the total composition of a previously vulcanized hydrocarbon rubber polymer;
      (ii) from about 1 to about 4% by weight of the total composition of a vulcanizing agent;
      (iii) from about 0.19 to 0.03% by weight of the total composition of a dibenzthiazole disulfide accelerator and from 0.03 to about 0.05% by weight of the total composition of a tetramethyl thiuram monosulfide accelerator;
   b. dry mixing said composition in such a manner that its constituent parts become uniformly dispersed;
   c. drying said composition;
   d. introducing said composition into a vulcanizing mold and thereafter vulcanizing said composition; and
   e. combining in said mixture a virgin hydrocarbon rubber polymer in an amount of up to about 5% by weight of the total composition.

15. The process of claim 13 wherein said composition is dried in such a manner that the temperature of said composition does not exceed about 220° F.

16. The process of claim 13 wherein said composition is vulcanized at a temperature between about 310° F and about 410° F, at a pressure above about 1000 pounds per square inch and for a period of time sufficient to vulcanize said composition.

17. The process of claim 13 wherein said composition is dry mixed in a ribbon-type dry mixer.

18. The process of claim 13 wherein the said composition is dried in a forced air vibratory.

19. The process of claim 13 wherein the vulcanizing mold employs hydraulic means to generate pressure.

20. The process of claim 13 wherein said process comprises:
   a. combining a mixture consisting essentially of of:
      (i) from about 98 to about 99% by weight of the total composition of a previously vulcanized hydrocarbon rubber polymer which comprises scrap rubber ground to about 20 mesh;
      (ii) from about 1 to about 2% by weight of the total composition of a vulcanizing agent which comprises sulfur;
      (iii) from about 0.19 to 0.03% by weight of the total composition of a dibenzthiazole disulfide accelerator and from 0.03 to about 0.05% by weight of the total composition of a tetramethyl thiuram monosulfide accelerator;
   b. dry mixing said composition in a forced air vibratory in such a manner that the temperature of the composition does not exceed about 220° F;
   c. introducing said composition into a vulcanizing mold and thereafter vulcanizing said composition at a temperature of about 350° F, at a pressure between about 1500 pounds per square inch and about 4000 pounds per square inch and for a period of time between about 5 minutes and about 20 minutes.

21. The vulcanized molded article of claim 20.

22. The vulcanized molded article of claim 21 wherein said article has a tensile strength greater than about 600 pounds per square inch and an elongation greater than about 150%.

23. The process of claim 13 wherein said process comprises:
   a. combining a mixture consisting essentially of of
      (i) from about 95 to about 96% by weight of the total composition of a previously vulcanized hydrocarbon rubber polymer which comprises scrap rubber ground to about 20 mesh;
      (ii) from about 1 to about 2% by weight of the total composition of a vulcanizing agent which comprises sulfur;
      (iii) an accelerator which comprises from between about 0.19 to about 0.3% by weight of the total composition dibenzthiazole disulfide and from about 0.03 to about 0.05% by weight of the total composition of tetramethyl thiuram monosulfide;

(iv) from about 1.0 to about 3.0% by weight of the total composition of a virgin hydrocarbon rubber polymer which comprises rubber latex;

b. dry mixing said composition in a forced air vibratory in such a manner that the temperature of the composition does not exceed about 220° F;

c. introducing said composition into a vulcanizing mold and thereafter vulcanizing said composition at a temperature of about 350° F, at a pressure between about 1500 pounds per square inch and about 4000 pounds per square inch and for a period of time between about 5 minutes and about 20 minutes.

24. The vulcanized molded article of claim 23.

25. The vulcanized molded article of claim 24 wherein said article has a tensile strength greater than about 600 pounds per square inch and an elongation greater than about 150%.

* * * * *